United States Patent [19]
Van Fossen

[11] 3,908,775
[45] Sept. 30, 1975

[54] TRANSFER CASE ASSEMBLY WITH A DOUBLE DUTY DIFFERENTIAL

[75] Inventor: Frederick L. Van Fossen, Fort Wayne, Ind.

[73] Assignee: International Harvester Company, Chicago, Ill.

[22] Filed: Dec. 16, 1974

[21] Appl. No.: 533,060

[52] U.S. Cl. ............................. 180/44 R; 74/710.5
[51] Int. Cl.² ........................................ B60K 17/34
[58] Field of Search ....... 180/44 R, 24.09; 74/710.5, 74/711, 700

[56] References Cited
UNITED STATES PATENTS

| | | | |
|---|---|---|---|
| 2,228,581 | 1/1941 | Olen | 74/710.5 |
| 2,267,562 | 12/1941 | Higgins | 180/24.09 |
| 2,309,441 | 1/1943 | Cook | 180/24.09 |
| 3,146,842 | 9/1964 | Nelson et al. | 74/710.5 X |
| 3,195,371 | 7/1965 | Christie | 74/710.5 X |
| 3,324,965 | 6/1967 | Koch et al. | 180/24.09 |
| 3,848,691 | 11/1974 | Dolan | 180/44 R |

Primary Examiner—Kenneth H. Betts
Attorney, Agent, or Firm—John P. O'Brien; Floyd B. Harman

[57] ABSTRACT

A transfer case assembly is disclosed as having a transfer case housing in which there is rotatably supported an input shaft and a first output shaft and with a differential cross and differential casing rotatably mounted on an intermediate shaft, the three shafts being in axial alignment. A second output shaft is rotatably supported in the housing in a chain drive drop box arrangement. A coupler means is used to selectively interconnect the three shafts, the differential cross and differential housing into two different modes of operation. One mode is in direct ratio with differential action between the front and rear axles to provide full time four-wheel operation under all surface conditions. The second mode is with two-to-one (2:1) speed reduction and with the front and rear drives locked together for severe surface conditions where speed reduction and maximum traction are needed.

9 Claims, 4 Drawing Figures

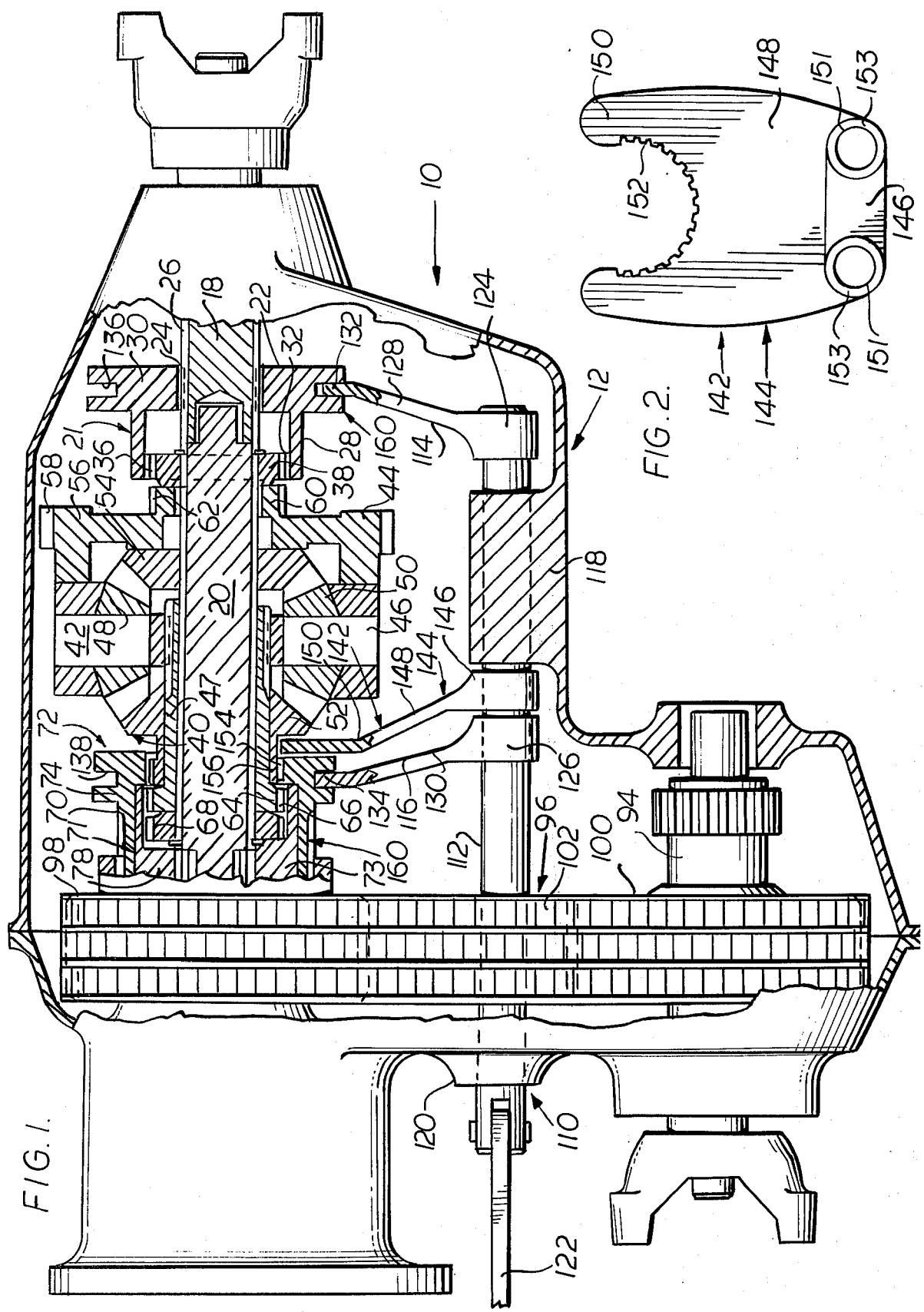

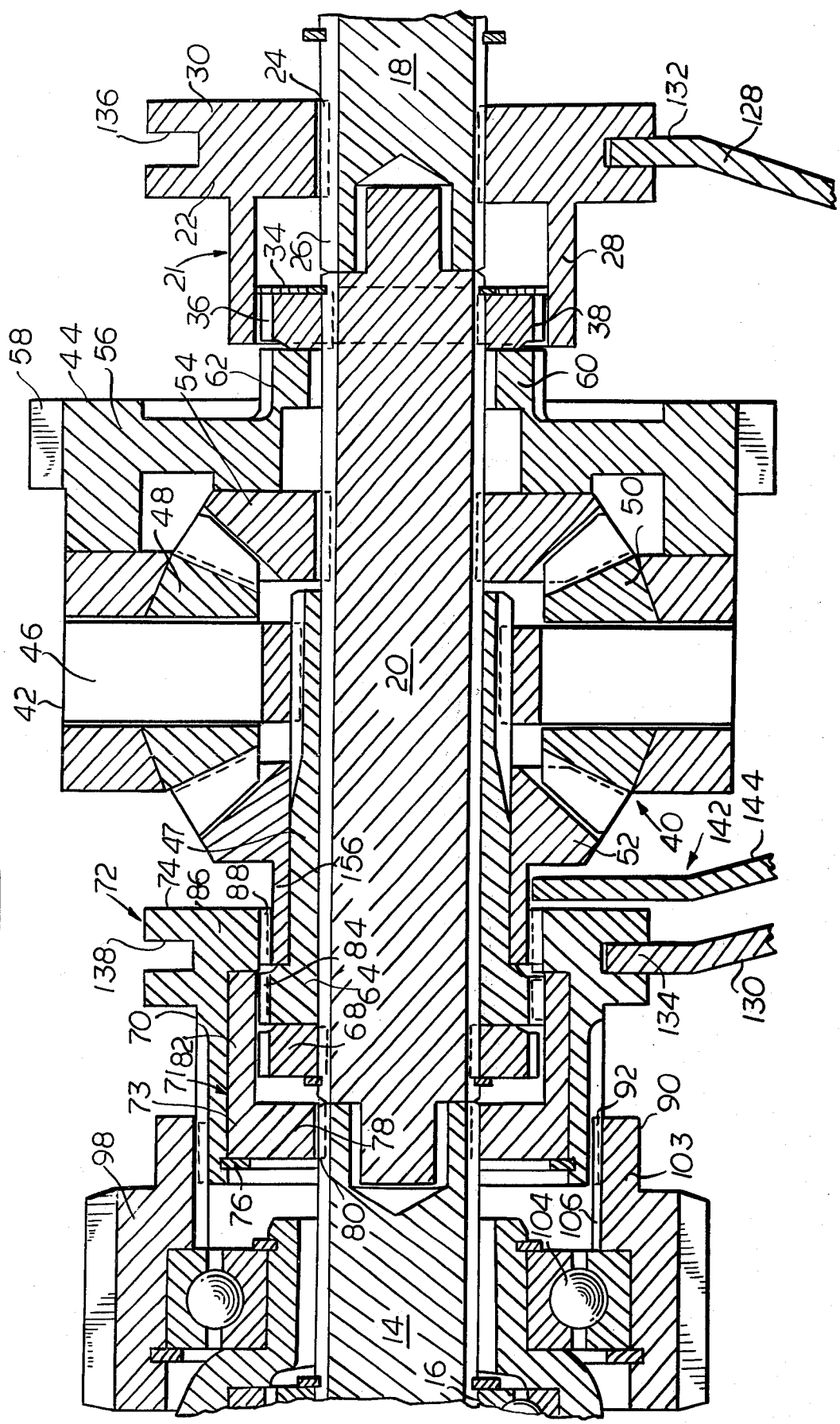
FIG.3. FIRST MODE

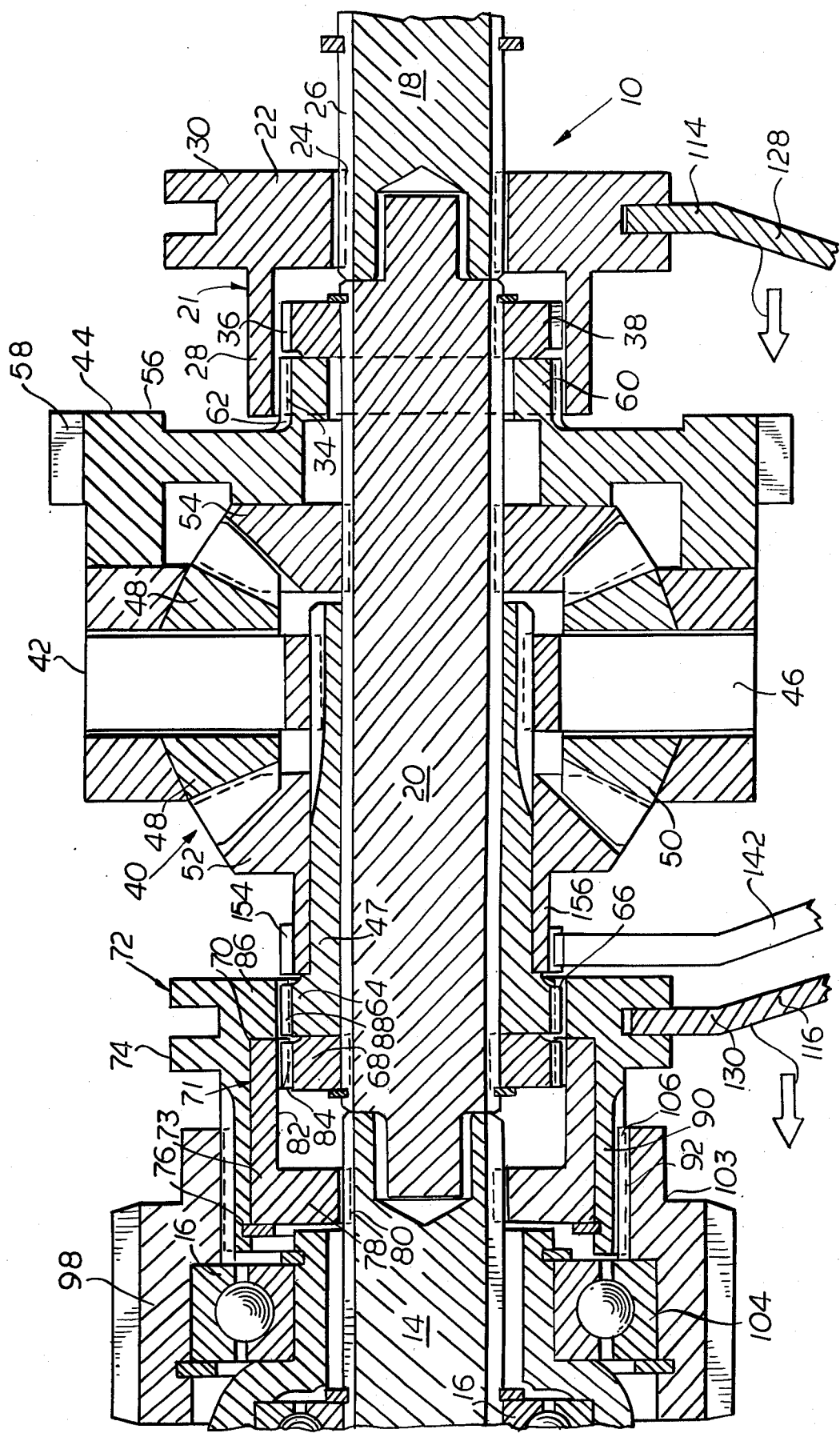
FIG. 4. SECOND MODE

TRANSFER CASE ASSEMBLY WITH A DOUBLE DUTY DIFFERENTIAL

BACKGROUND OF THE INVENTION

This invention relates to a transfer case for four-wheel drive vehicles, and in particular to a transfer case having two different modes of four-wheel operation.

This invention is designed to provide a second mode of four-wheel operation for moving through extreme surface conditions where maximum traction capability and reduced speed are required. When encountering such severe surface conditions, it is possible by following the principles of this invention to shift into a second mode of four-wheel operation to cause the output torque to be multiplied by two and the speed halved.

SUMMARY OF THE INVENTION

A transfer case assembly embodying the principles of this invention comprises a coupler means to selectively interconnect the input and two output shafts with the differential cross and differential housing into one of two different modes of operation. In one mode the three shafts are interconnected with the differential cross and housing to provide direct ratio differential action between the front and rear axle to effect full time four-wheel operation under all surface conditions. In the other mode, one of the side gears is held in a fixed stationary position relative to the transfer casing and the three shafts are interconnected with the differential cross and housing in a manner to lock the front and rear drives together to effect a two-to-one (2:1) speed reduction and a multiplication of the output torque by a factor of two.

BRIEF DESCRIPTION OF THE DRAWINGS

For a better understanding of this invention reference may be made to the accompanying drawings, in which:

FIG. 1 is a sectional side view of the transfer case assembly illustrating the preferred embodiment of this invention;

FIG. 2 is an end view of a locking fork which is slidably mounted in the transfer case assembly;

FIG. 3 is a partial sectional side view of the upper portion of the transfer case assembly of FIG. 1 with the parts shown in greater detail to illustrate the relative position of parts in one mode of four-wheel operation; and FIG. 4 is a partial sectional side view identical to FIG. 3, except the various parts are depicted in the second mode of four-wheel operation.

DESCRIPTION OF THE PREFERRED EMBODIMENT

Referring to the drawings a transfer case assembly 10 is shown and includes a housing 12 which encompasses the operating parts of the transfer case assembly. An input shaft 14 is disposed within the upper portion of the housing 12 in rotating relation by means of bearings 16 so as to be axially aligned with the output shaft of a transmission or shift box (not shown) in order to provide a drive to the axles of a vehicle. A rear output shaft 18 is rotatably mounted in the upper portion of housing 12 in a coaxial relation with input shaft 14 for connection with the rear axle of the vehicle (not shown). Intermediate shaft 20 is mounted between the inwardly facing ends of input and output shafts 14, 18 in a coaxial relation therewith.

A first coupler means 21 in the form of slidable member 22 having a circular body portion 30 with internal axially extending splines 24 is slidingly mounted on the external axially extending splines 26 of rear output shaft 18. Slidable member 22 has a cylindrical portion 28 extending forwardly from its circular body portion 30 coaxially about output shaft 18. A coupling ring portion 32 having a central bore with internal splines 34 is provided at the outer end of nose portion 28. Internal spline 34 is adapted to be positioned into sliding engagement with the external spline 36 of a coupling gear 38 which is mounted in non-rotational manner on the rearward end portion of intermediate shaft 20.

Differential means 40 is non-rotationally supported on intermediate shaft 20 and comprises differential cross 42 and differential casing 44. Differential cross 42 includes a cross pin 46 extending radially in a fixed relation from a sleeve portion 47 that is mounted in a splined relation on intermediate shaft 20. A pair of conventional pinion gears 48, 50 are rotationally mounted on cross pin 46 and are in driving relation with side gears 52, 54.

Differential casing 44 has a rear cap section 56, which is rotationally supported within the transfer case housing 12 by bearing means 58 and which has a rearward extending coupling gear portion 60 having an external spline 62 adopted to be engaged in driven relation with coupling ring portion 32 of coupling gear 22.

At the forward end of sleeve portion 47 there is provided a gear coupling member 64 having an external spline 66. Adjacent gear coupling member 64, a front gear coupler 68 is provided in splined relation at the forward end of intermediate shaft 20.

A forward slidable coupler member 70 is provided coaxially about input and intermediate shafts 14, 20 and consists of two coupler means 71 and 72 in the form of inner and outer hubs 73 and 74, respectively, disposed together in an interfitting coaxial arrangement. Hubs 73, 74 are held together by retainer ring 76. Inner hub 73 is made up of an annular end 78 having a central bore with internal splines 80 and a cylindrical body 82 with internal splines 84 formed at its rearward end for providing a splined relation with either gear coupling member 64 or front gear coupler 68 to thereby cause coupler means 71 to connect input shaft 14 to either cross pin 46 or intermediate shaft 20.

Outer hub 74 is formed with an annular end 86 having a central bore with internal splines 88 and a cylindrical body portion 90 having external splines 92 extending axially along substantially its length.

A second output shaft 94 is rotationally supported within the lower portion of transfer case housing 12 and is driven via chain drive means 96 comprising upper and lower sprockets 98, 100 and endless chain 102 disposed therearound. Upper sprocket 98 is rotationally mounted by bearing means 104 and includes a reduced diameter stepped portion 103 extending forwardly of bearing means 104, which is formed with splines 106 for sliding engagement with external splines 92 of cylindrical body portion 90 to thereby effect a connecting relationship with coupler means 72.

To provide for external selective shifting of the rear and forward coupler members 22, 70, a shifter means 110 is provided and comprises a pair of closely spaced parallel plungers 112 (only one shown) slidably mounted below and parallel to the three shafts 14, 18 and 20 and two fork shift members 114, 116. Each plunger 112 is slidably supported through a central bore in a sleeve member 118 and through a bushing 120 positioned in an opening in the front wall of housing 12, where the outer ends of plungers 112 are interconnected to a selector lever 122.

Fork shift members 114, 116 have, respectively, base portions 124, 126; stem portions 128, 130 and annular ring portions 132, 134 seated within the outer circular grooves 136, 138 formed, respectively, in the outer peripheral edge of rear and forward slidable members 22, 70. By virtue of this arrangement, displacement of selector lever 122 will cause the three coupler means 21, 71 and 72 to shift axially in unison between the two positions illustrated in FIGS. 2 and 3. This conjoint cooperation of coupler means 21, 71 and 72 defines coupling means 160 which selectively interconnects the differential cross 42 and differential housing 44 to the three shafts 14, 18 and 94 in two distinct arrangements depending on the position of plunger 112 of shifter means 110.

In order to selectively lock side gear 52 in place, a gear locking means 142 is provided and comprises a locking fork 144 (FIG. 2) mounted adjacent to fork shift member 116 on plunger 112. Gear locking fork 144 comprises a base portion 146, a stem portion 148 and an outer arcuate portion 150 having internal splines 152 of a size to fit in engaging relation with the external splines 154 formed on the outer end portion 156 of side gear 52. The base portion 146 is identical in configuration to base portions 124, 126 of fork shift member 114, 116 and includes a pair of spaced circular openings 151 in which are mounted a pair of bushings 153 for mounting on plungers 112.

From the foregoing description it will be appreciated that shifter means 110 can be selectively moved to one of two positions to provide two different modes of four-wheel operation. One mode, as depicted in FIG. 3, is in direct ratio with differential action between the front and rear axles. In this mode, the input torque applied to input shaft 14 is transferred to the differential cross 42 and differential casing 44 via the coupler means 71. The torque is then equally distributed through pinion gears 48 and 50 to the side gears 52 and 54. The torque applied to side gear 54 is transmitted through intermediate shaft 20 and coupler means 21 to output shaft 18. The torque applied to the other side gear 52 is transferred to the upper sprocket 98 through coupler means 72, which in turn drives chain 102 and lower sprocket 100 to thereby drive second output shaft 94.

To shift from the first mode (FIG. 3) to the second mode (FIG. 4), shifter means 110 is actuated such that plunger 112 is moved to the left as viewed in FIGS. 2 and 3 a distance sufficient to cause the rear and forward slidable members 22, 70 to move in unison from the position of FIG. 2 to the position of FIG. 4. Simultaneously gear locking means 142 is brought into locking engagement with side gear 52 by virtue of the interfitting engagement of the internal splines 152 of gear locking fork 144 with the external splines 154 on the outer end portion 156 of side gear 52.

In the second mode with the parts positioned as depicted in FIG. 4, the input torque applied to input shaft 14 is transferred to the rear side gear 54 through coupler means 71 and intermediate shaft 20. Since the front side gear 52 is held in a fixed stationary relation with respect to the transfer case housing 12, the rear side gear 54 will transmit its torque to differential casing 44 and differential cross 42, which are locked together. The housing 44 and cross 42 transmit this torque to the first output shaft 18 via coupler means 21. This output torque will be two times the torque transmitted to shaft 18 in the first mode and one-half the speed by virtue of the fact that the front side gear 52 is locked in position.

The differential casing 44 and differential cross 42 also transmit torque to the upper sprocket 98 through coupler means 72 which comprises hub 74 in splined engagement with cross 42 at its annular end 86. The upper sprocket 98 then transmits this torque to the lower sprocket 100 through endless chain 102.

What is claimed is:

1. A transfer case assembly comprising a transfer case housing, an input shaft and two output shafts rotatably supported within said housing, a differential cross and a differential casing each rotatably supported within said housing, said differential cross including cross pin means, a pair of pinion gears and a pair of side gears disposed in said differential casing with said pinion gears each being rotatable on said pin means and with each of said pinion gears meshing with both of said side gears, gear locking means for selectively holding one of said side gears in a non-rotative relation to said housing and coupling means for selectively interconnecting said differential cross and housing to said three shafts for two modes of four-wheel drive operations, wherein one mode said coupling means connects: said cross pin to said input shaft, one of said side gears to one of said output shaft and the other of said side gears to the other of said output shafts, and wherein the other mode said gear locking means holds one of said side gears in a non-rotative position and said coupling means connects: the other of said side gears to said input shaft, said differential casing to one of said output shafts, and said cross pin to the other of said output shafts.

2. The Combination of claim 1, further comprising shifting means for selectively moving in unison said coupling means and said gear locking means such that in said one mode said one side gear is free to spin and in said other mode said gear locking means is moved in said holding position.

3. The combination of claim 2, wherein said coupling means comprises first, second and third coupler means carried by said shifting means for conjoint movement with said gear locking means, wherein said one mode of four-wheel drive operation said first coupler means connects said cross pin to said input shaft for rotation therewith, said second coupler means connects one of said side gears to one of said output shafts for rotation therewith and said third coupler means connects the other of said side gears to the other of said output shafts for rotation therewith, and wherein said other mode said first coupler means connects one of said side gears to said input shaft for rotation therewith, said second coupler means connects said casing to one of said output shafts for rotation therewith and said third coupler means connects said cross pin to the other of said output shafts for rotation therewith.

4. A transfer case assembly comprising a transfer case housing, an input shaft rotatably supported in said housing, a first output shaft rotatably supported in said housing in axial alignment with said input shaft, a differential cross and a differential casing each rotatably supported in coaxial relation to and between said input and first output shafts, and differential cross including cross pin means, a pair of pinion gears and a pair of side gears disposed in said differential casing with said pinion gears each being rotatable on said pin means and with each of said pinion gears meshing with both of said side gears, a second output shaft rotatably supported in said housing parallel to and offset from said input shaft, first drive sprocket rotatably supported in said housing coaxially of said input shaft, second drive sprocket rotatably supported on said second output shaft in a non-rotational fixed relation therewith, chain drive means directly connecting said two sprockets, first, second and third coupler means and side gear locking means slidably disposed within said housing for movement between a first and second position, shifting means for selectively moving in unison said three coupler means and said side gear locking means to either of said first and second positions, wherein said first position said first coupler means connects said cross pin to said input shaft for rotation therewith, said second coupler means connects one of said side gears to said first output shaft for rotation therewith and said third coupler means connects the other of said side gears to said first drive sprocket for rotation therewith and wherein said second position said first coupler means connects said other side gear to said input shaft for rotation therewith, said gear locking means engages and holds said one side gear in non-rotative engagement relative to said housing, said second coupler means connects said casing to said first output shaft and said third coupler means connects said cross pin to said first drive sprocket for rotation therewith.

5. The combination of claim 4, wherein said first coupler means comprises an inner hub having a cylindrical body portion with one annular end formed with internal splines in its central bore of a size for providing sliding along the external splines of said input shaft and with its other annular end having internal splines in its central bore and wherein said third coupler means comprises an outer hub coaxially disposed about and fixed to said inner hub, said outer hub having a cylindrical body portion with one annular end extending beyond said other annular end of said inner hub which is formed with internal splines in its central bore and having external splines extending substantially along its entire length from said one annular end.

6. The combination of claim 4, wherein said second coupler means comprises a slidable member having internal axially extending splines formed in one annular end for sliding engagement with the external splines on said first output shaft and having a cylindrical portion extending coaxially about said first output shaft from said one annular end and a ring portion formed at its other end with internal splines formed in the central bore of said ring portion.

7. A transfer case assembly comprising a transfer case housing, an input shaft rotatably supported in said housing, a differential cross and a differential casing each rotatably mounted within said housing, said differential cross including cross pin means, a pair of pinion gears and a pair of side gears disposed in said differential casing with said pinion gears each being rotatably mounted on said pin means and with each of said pinion gears meshing with both of said side gears, first and second output shafts rotatably supported in said housing, first, second and third coupler means and side gear locking means slidably disposed within said housing for movement between a first and second position, shifting means for selectively moving in unison said three coupler means and said side gear locking means to either of said first and second positions, wherein said first position said first coupler means connects said cross pin to said input shaft for rotation therewith, said second coupler means connects one of said side gears to one of said output shafts for rotation therewith and said third coupler means connects the other of said side gears to the other of said output shafts for rotation therewith, and wherein said second position said first coupler means connects one of said side gears to said input shaft for rotation therewith, said gear locking means engages and holds the other of said side gears in non-rotative engagement relative to said housing, said second coupler means connects said casing to one of said output shafts for rotation therewith and said third coupler means connects said cross pin to the other of said output shafts for rotation therewith.

8. The combination of claim 7, wherein said first coupler means comprises an inner hub having a cylindrical body portion with one annular end formed with internal splines in its central bore of a size for providing sliding along the external splines of said input shaft and with its other annular end having internal splines in its central bore and wherein said third coupler means comprises an outer hub coaxially disposed about and fixed to said inner hub, said outer hub having a cylindrical body portion with one annular end extending beyond said other annular end of said inner hub which is formed with internal splines in the central bore and having external splines extending substantially along its entire length from said one annular end.

9. The combination of claim 7, wherein said second coupler means comprises a slidable member having internal axially extending splines formed in one annular end for sliding engagement with the external splines on said first output shaft and having a cylindrical portion extending coaxially about said first output shaft from said onee annular end and a ring portion formed at its other end with internal splines formed in the central bore of said ring portion.

* * * * *